United States Patent
Brookins

(10) Patent No.: US 7,834,904 B2
(45) Date of Patent: Nov. 16, 2010

(54) VIDEO SURVEILLANCE SYSTEM

(75) Inventor: Nicholas Shayne Brookins, Pontiac, MI (US)

(73) Assignee: Sam Systems, Inc., Troy, MI (US)

( * ) Notice: Subject to any disclaimer, the term of this patent is extended or adjusted under 35 U.S.C. 154(b) by 2096 days.

(21) Appl. No.: 10/691,129

(22) Filed: Oct. 22, 2003

(65) Prior Publication Data

US 2005/0088519 A1    Apr. 28, 2005

(51) Int. Cl.
H04N 7/18 (2006.01)
(52) U.S. Cl. .................................. 348/143; 725/105
(58) Field of Classification Search ................ 348/143, 348/384.1, 15, 213; 725/105, 88; 358/188; 710/105; 395/806; 384/143; 380/277, 279, 380/283; 709/247
See application file for complete search history.

(56) References Cited

U.S. PATENT DOCUMENTS

| | | | | |
|---|---|---|---|---|
| 5,530,472 A * | 6/1996 | Bregman et al. | ......... | 348/14.09 |
| 6,032,180 A * | 2/2000 | Nishikawa | ................. | 725/115 |
| 6,185,598 B1 * | 2/2001 | Farber et al. | ................ | 709/200 |
| 6,256,675 B1 * | 7/2001 | Rabinovich | ................. | 709/241 |
| 6,529,234 B2 * | 3/2003 | Urisaka et al. | ......... | 348/211.99 |
| 6,792,470 B2 * | 9/2004 | Hakenberg et al. | .......... | 709/232 |
| 7,171,485 B2 * | 1/2007 | Roach et al. | ................. | 709/232 |
| 2001/0033329 A1 | 10/2001 | Zhang et al. | | |
| 2002/0013948 A1 * | 1/2002 | Aguayo et al. | ................. | 725/91 |
| 2002/0038456 A1 * | 3/2002 | Hansen et al. | ................. | 725/46 |
| 2002/0047916 A1 * | 4/2002 | Miyagi et al. | ............. | 348/384.1 |
| 2002/0056010 A1 * | 5/2002 | Lincoln et al. | .............. | 709/247 |
| 2002/0171737 A1 * | 11/2002 | Tullis | .......................... | 348/143 |
| 2002/0175995 A1 | 11/2002 | Sleeckx | | |
| 2003/0043279 A1 | 3/2003 | Alardin | | |
| 2003/0079016 A1 * | 4/2003 | Tsao | .......................... | 709/226 |
| 2003/0085998 A1 * | 5/2003 | Ramirez-Diaz et al. | ..... | 348/143 |
| 2003/0107648 A1 | 6/2003 | Stewart et al. | | |
| 2003/0163826 A1 | 8/2003 | Weinstein | | |
| 2003/0206636 A1 * | 11/2003 | Ducharme et al. | .......... | 380/277 |
| 2004/0034870 A1 * | 2/2004 | O'Brien et al. | ................ | 725/88 |

* cited by examiner

Primary Examiner—John M Villecco
Assistant Examiner—Kent Wang
(74) Attorney, Agent, or Firm—Harness, Dickey & Pierce PLC

(57) ABSTRACT

A video transmission system typically includes a video server adapted to receive video data from one or more video cameras. In some instance, the video server may be operable to buffer the video data and transmit the video data across a network to various client computing devices. In an improved video transmission system of the present invention, the client computing devices may be further configured to retransmit video data across the network to other client computing devices, thereby reducing the bandwidth and computing load placed on the video server.

16 Claims, 6 Drawing Sheets

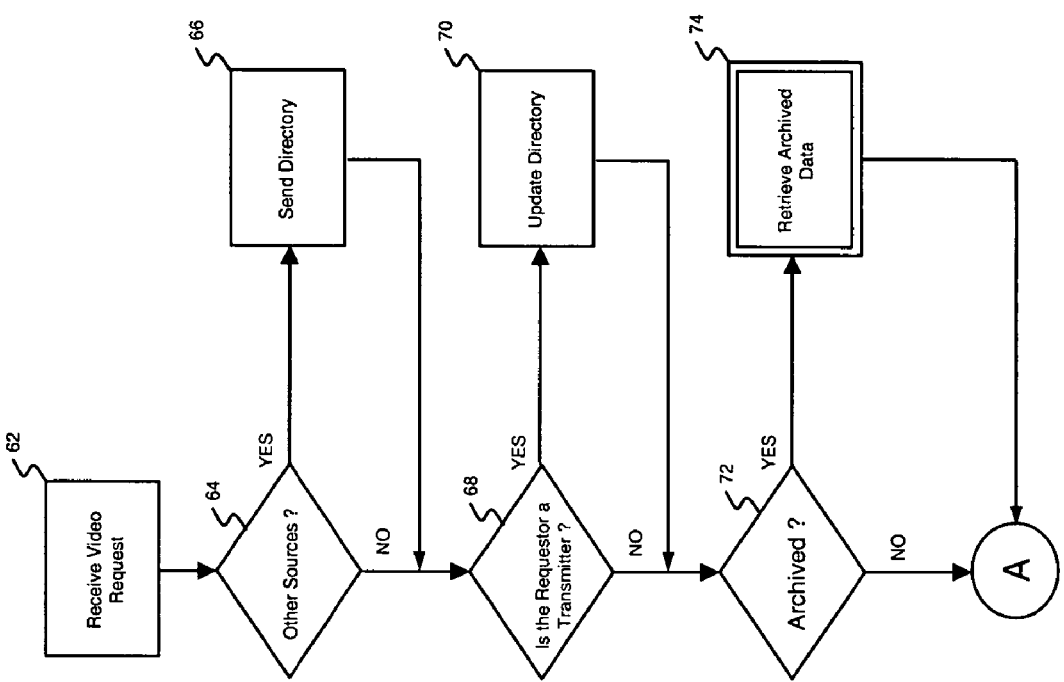

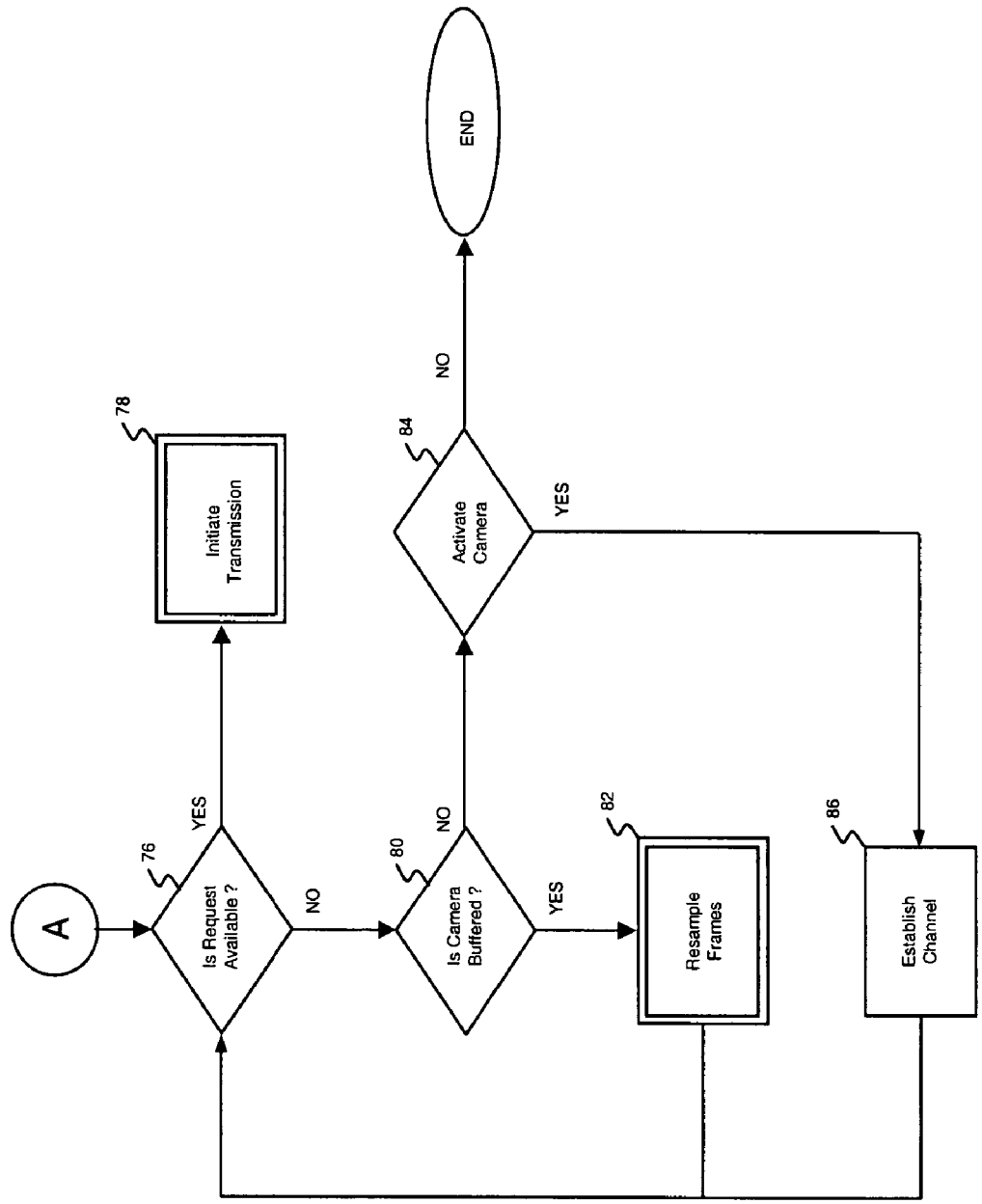

VIDEO SURVEILLANCE SYSTEM

FIELD OF THE INVENTION

The present invention relates to video surveillance systems and, more particularly, to video surveillance system having at least some client computing devices configured to retransmit received video data across the network to other client computing devices.

BACKGROUND OF THE INVENTION

Video surveillance systems are used in a wide number of applications, such as security. A video surveillance system typically includes one or more cameras which capture video images at a particular location and transmit the video data to a video server. The video server may in turn display the received video data as well as buffer and/or record the video data for subsequent transmissions. In some instance, the video server may also be configured to transmit the video data across a network to various client computing devices. Due to various network traffic considerations, it may be desirable to provide alternative sources for providing video data to requesting client computing devices.

SUMMARY OF THE INVENTION

An improved video transmission system is provided in accordance with the present invention. The video transmission system includes: a video server adapted to receive video data from one or more video cameras. The video server is operable to buffer the video data and transmit the video data across a network to various client computing devices. At least some of the client computing devices are configured to retransmit video data across the network to other client computing devices, thereby reducing the bandwidth and computing load placed on the video server.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 4A and 4B are flowcharts illustrating the processing steps taken by a retransmitter component residing on a video server in accordance with the present invention.

DETAILED DESCRIPTION OF THE PREFERRED EMBODIMENTS

Figure 1:
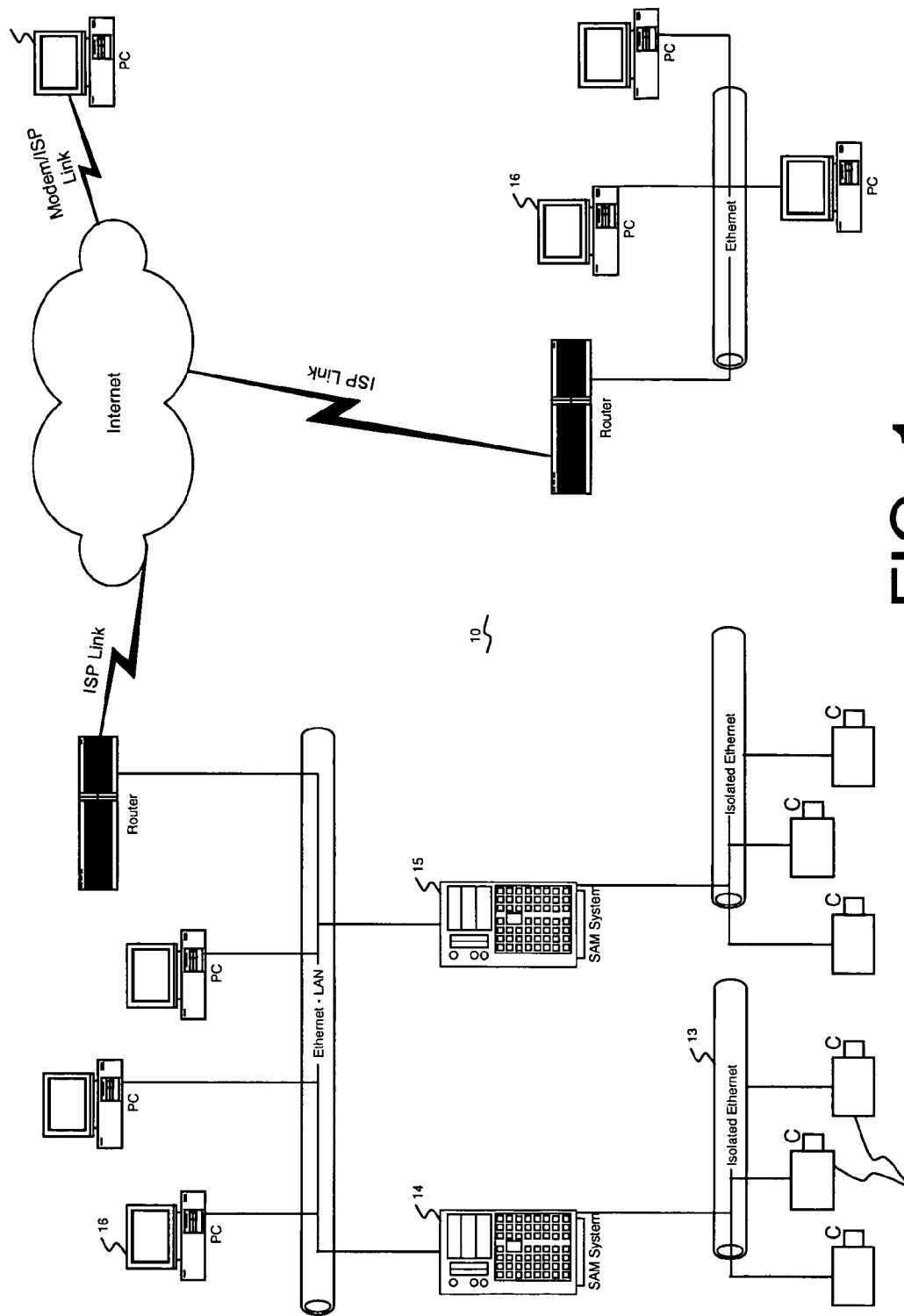
FIG. 1 is a diagram depicting an exemplary network environment which may support a video transmission system.

FIG. 1 is a diagram depicting an exemplary network environment 10 which may support a video transmission system. Although a video surveillance application is described below, this is not intended as a limitation on the application of the broader aspects of the present invention. On the contrary, the video transmission system of the present invention may be suitably used in other applications, such as video conferencing.

The video transmission system is generally comprised of one or more video sources 12 connected over a local area network 13 to a video server 14. In an exemplary embodiment, the video sources 12 are further defined as digital cameras which capture video images at a particular location and transmit the video data across the network 13 to the video server 14. It is readily understood that the video sources 12 may be directly coupled or connected by other means to the video server 14. Moreover, it is readily understood that other types of video sources, such as analog cameras or captured screen shots, are also within the scope of the present invention.

A video server generally refers to a central computing component, such as a multiplexer or a recording device, which provides the functionality described below. However, many IP-based cameras include their own video server component which can directly receive and process requests from clients. Therefore, it is also envisioned that the video server component described below may be fully integrated with the video source without requiring a separate device.

Figure 2:
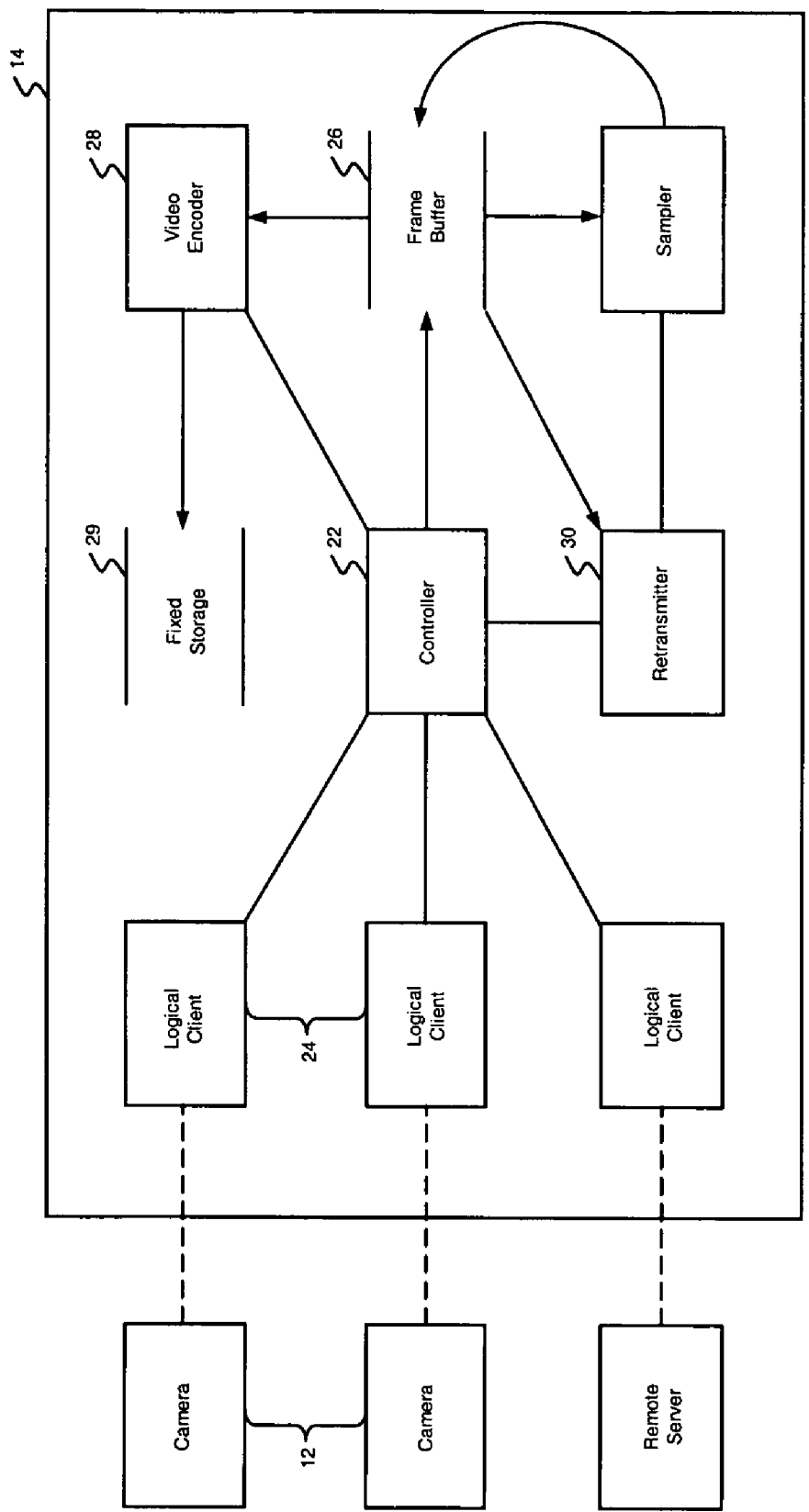
FIG. 2 is a diagram depicting the basic components of a video server in accordance with the present invention.

Referring to FIG. 2, a video server 14 is adapted to receive video data from one or more cameras 12. A camera controller 22 initiates a thread for each camera connection as represented by camera client software component 24. In the exemplary embodiment, the video data is received across a well known TCP/IP socket connection. Depending on camera configuration, video frames are retrieved from each camera at a particular frame rate and resolution, and then stored in a frame buffer 26. Thus, the video data is buffered for subsequent retransmission across the network. The camera controller 22 otherwise manages each camera connection as is well known in the art.

Additionally (or alternatively), video data may be archived (i.e., recorded to) to a persistent data store 29. The camera controller 22 initiates a separate thread indicated by video encoder 28 for each video signal feed which is to be archived. To reduce storage requirements, it is envisioned that archived video data may be encoded into an MPEG-4 video format or some other known video encoding format.

Referring to FIG. 1, requests for buffered or archived video data may then be received from one or more remotely located computing devices 16. In response to such requests, the video server 14 is operable to transmit the video data across the network to the requesting computing devices 16. Retransmission requests are handled by a retransmitter component 30 of the video server 14 (shown in FIG. 1) as will be further described below.

Moreover, the video transmission system of the present invention is further configured such that client computing devices 16 receiving video data from the video server 14 may also be configured to retransmit video data across the network, thereby reducing the bandwidth and computing load placed on the video server. Briefly, the video server maintains a directory of computing devices to whom video data is currently being sent to and which are configured to retransmit the video data. When a video request is initially sent to the video server and periodically thereafter, the directory is sent to the requesting client computing device. The requesting client computing device may then determine if an alternative source exists for the requested video stream. If so, the requesting client computing source may configure itself to receive the video data from this alternative source. This retransmission feature is better understood from the description provided below.

Figure 3:
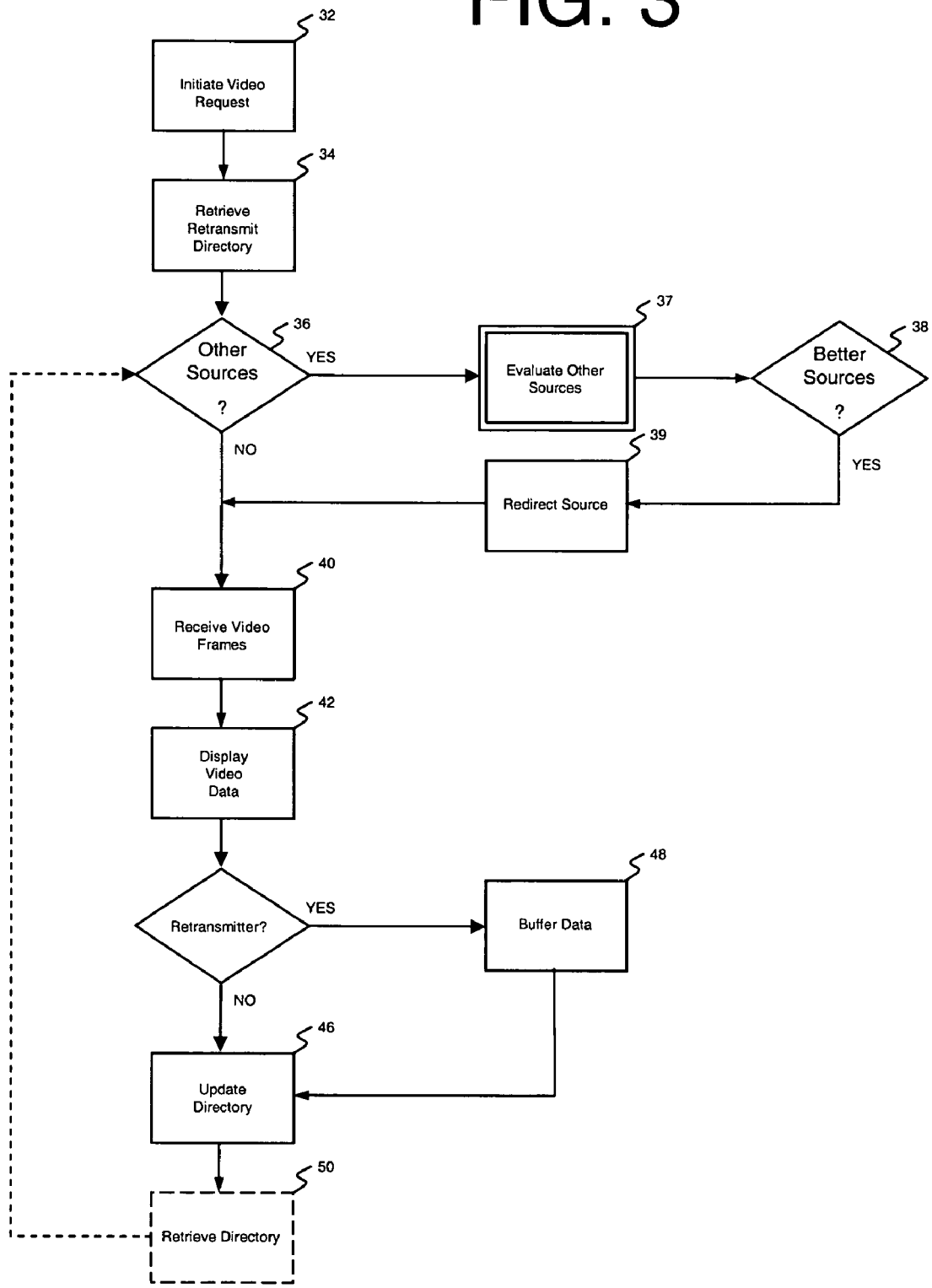
FIG. 3 is a flowchart illustrates the basic processing steps taken by a client computing device configured to receive video data in accordance with the present invention.

FIG. 3 illustrates the basic processing steps taken by a client computing device configured to receive video data. It is to be understood that only the relevant steps of the process are described below, but that other software-implemented instructions may be needed to control the overall operation of the client device.

To initiate a request, the client computing device formulates and transmits a video request to the video server as shown at step 32. Each request identifies one or more cameras from which to receive video data as well as a resolution at which the video data will be displayed. To facilitate the retransmission feature, each request may further specify whether video data is to be sent only from a dedicated video source; whether the client computing device is configured to retransmit received video data; and, if so, whether it will receive the video data on a dedicated basis. To the extent that the video request is for archived data, the request will also specify a starting point in time from which to begin transmission of the video feed. It is readily understood that other types of data may also be embodied in the video request.

In response to the video request, the client computing device receives a retransmitter directory at step 34 from the video server. As noted above, the retransmitter directory maintains a list of client computing devices to whom video data is currently being sent to and which are configured to retransmit the video data. More specifically, each entry in the directory identifies a camera whose video data is capable of being retransmitted from a source other than the video server, a network address for this additional source, and an indicator as to whether the video data is being received on a dedicated basis.

Upon receipt of the retransmitter directory, the directory is evaluated at step 36 for alternative sources for the requested video data. For each identified alternative source, the client computing device initiates a thread at step 37 to further evaluate the source. In an exemplary embodiment, each alternative source may be evaluated based on the response time (i.e., transmission time) to retrieve one or more video frames from the source. Thus, the client computing device requests a video frame from the alternative source and, upon receipt of the requested video frame(s), computes a response time. It is readily understood that other metrics associated with the transmission path from the alternative source may be employed to evaluate the source.

Once each alternative source is evaluated, the client computing device makes a determination at step 38 if there is a better source for the requested video data. For example, is there an alternative source whose response time is shorter than the video server. If so, the client computing device is redirected at step 39 to retrieve the video data from the alternative source.

It is also envisioned that the client computing device may be manually configured to receive video data from an alternative source. For instance, the retransmitter directory may be accessible on a video server (e.g., published on a web page) to a system user. In this case, the system user evaluates the available sources and then manually configures (or perhaps, selects a link in the directory which initiates an automated configuration) the client computing device to receive video data from a selected source.

Continuing to step 40, the client computing device receives video data from the designated source. The video server responds to the client request by sending the bytes that compose the image. Preferably, the image or video data would be compressed in a still image format such as JPEG, or a motion image format such as MPEG, although this is not necessary to the present invention. It is envisioned that the frame data would be sent as an array of bytes over a TCP-IP network socket, although other network protocols or methods could also suffice. If sending a sequence of still images, the server will wait for acknowledgement or otherwise delimit the images with a specified code to keep each frame distinct. The client will listen on this socket, and receive each image or frame of video. Upon receiving it sends acknowledgment if required by the communication protocol and requests the next frame if needed. The client may also specify a maximum frame rate, which the server uses to calculate a pause in between frame transmissions. As each frame is received, it is then decoded and displayed to a system user through a graphical interface, recorded or used for other purposes at step 42 by the client computing device.

In some instances, the client computing device may be configured to retransmit one or more received video data streams across the network. To keep the retransmitter directory current, the client computing device periodically updates the retransmitter directory maintained on the video server at step 46. Furthermore, when client computing device is currently retransmitting video data, it will also place any received video frames in a frame buffer as shown at step 48. Subsequent retransmission of the buffered video data is further handled by a retransmitter component of the client computing device as will be further described below.

Lastly, the client computing device may periodically retrieve the retransmitter directory from the video server as shown at step 50. In this way, the client computing device can periodically determine if an alternative source has become available since its initial video request and, if so, proceed to evaluate the new source in the manner described above.

It is envisioned that the client processing described above may also be incorporated into one or more of the video servers (designated as 15 in FIG. 1) residing in the video transmission system. In this way, a video server may request and receive video data from another video server. Thus, this configuration is advantageous in that such a video server is able to retransmit video data captured from video sources locally connected or connected via another video server.

On the other hand, processing steps taken by the retransmitter component 30 of the video server is further described in relation to FIGS. 4A and 4B. Video requests are received by the retransmitter component 30 at step 62. Each video request is subsequently processed in a similar manner. It is again understood that only the relevant steps of the process are described below.

First, the retransmitter component 30 determines if there is an alternative source for the requested video data as shown at step 64. This determination is made searching for the camera identifier embodied in the video request in the retransmitter directory. If an alternative source is identified, the retransmitter sends the directory (or at least the relevant portions thereof) at step 66 to the requesting client device. The retransmitter component 30 also determines whether the requesting client device is configured to retransmit received video data at step 68. If so, an entry for the requesting computing device is placed at step 70 in the retransmitter directory.

Additionally, the retransmitter component 30 evaluates at step 72 whether the request is for a live or archived video stream. For an archived video stream, the retransmitter initiates a parallel thread to retrieve the archived video data as shown at step 74. The parallel thread is operable to convert the video data into an applicable format and place it into the frame buffer for subsequent transmission. It is readily understood that conversion of the video data includes any needed decoding.

It is envisioned that two or more client computing devices may be requesting archived video data that is relatively proximate in time. Rather than buffer two video streams, the video server is further operable to synchronize the requests. For instance, the earlier request may be delayed in time to coincide with the later request. In this way, only a single video stream is buffered, thereby minimizing the utilized bandwidth.

Next, the retransmitter component 30 determines at step 76 if the requested video data is available to be transmitted. For example, is the video data available at the requested resolution and/or on a dedicated basis. If video data is available as requested, another parallel thread is initiated at step 78 to begin transmitting the buffered data across the network. The retransmitter will use any available parameters passed by the client as described above, and send the image data back to the client. In between frames, the retransmitter will typically send a termination string and wait for acknowledgement, or otherwise include a delimiter to facilitate the client in determining where each frame ends. The frames may also be further described with tags indicating the size or other attributes of the frame, such as encoding type, as well as other data such as the time at which the frame was originally captured.

When a different client computing device requests the same video stream, the retransmitter utilizes the same buffered frames to feed requests to all attached clients. In this way, the video server is able to broadcast a given video stream across the network without employing any special hardware on the client computing devices and reduce the bandwidth required between the retransmitter and the server to as little as one stream.

In some instances, the requested video data may be buffered at a resolution which is higher than that requested by the client computing device. Thus, the retransmitter component 30 further determines at step 80 if any video data is available from the requested camera. If video data from the requested camera is buffered, the retransmitter component 30 then initiates a parallel thread to resample the available video data as shown at step 82. For instance, video data from a camera having a 640×480 pixel resolution may be scaled down to a lower requested resolution (e.g., 320×240 pixel resolution). The available video data is scaled using known sampling techniques and then stored as an additional entry in the frame buffer. Processing continues at step 76, where the retransmitter component 30 again checks to see if the requested video data is available in the frame buffer. Rescaled frames satisfying the video request are available to be transmitted to the requesting computing device. In this way, the transmission system of the present invention optimizes bandwidth use by not transmitting extraneous video data across the network. Similarly, the frame may be encoded in a format the client does not understand or prefer. In this case, the retransmitter may re-encode the frame into the format preferred by the client and store it in the buffer.

When no video data is buffered for a requested camera, the retransmitter component 30 in turn determines at step 84 whether a channel should be established with the requested camera. If the retransmitter is configured as dedicated, it will typically establish a channel to a video source on behalf of its client at step 86, even if that source is not currently buffered; otherwise, the retransmitter may choose to disconnect the client, at which point client would continue testing other sources or choose to continue receiving from the original video server. This option is intended to be used on a network server that is designed specifically to be used to provide camera data to other clients as a sort of video proxy.

Figure 5:
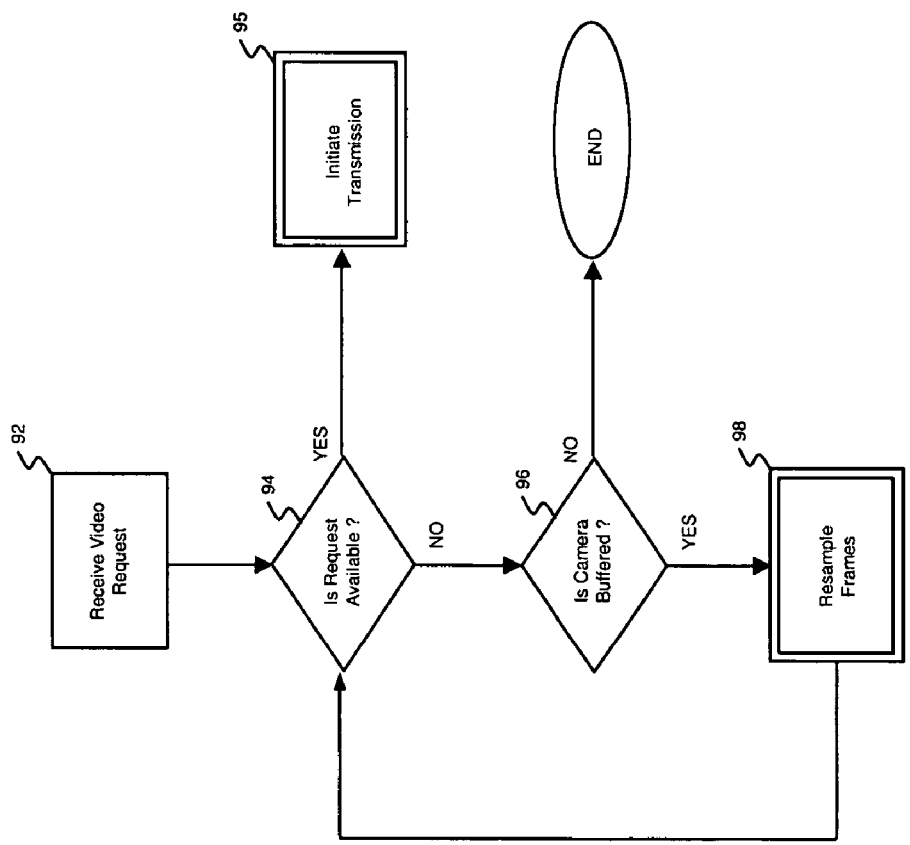
FIG. 5 is a flowchart illustrating the processing steps taken by a simplified retransmitter component suitable for use in client computing devices in accordance with the present invention.

To enable the retransmission feature, at least some of the client computing devices are configured to retransmit video data across the network to other client computing devices. Thus, applicable client computing devices also include a retransmitter component. An exemplary retransmitter component suitable for use in a client computing device is shown in FIG. 5. In this exemplary embodiment, the basic processing steps of the retransmitter component are similar to, but more simplified than the processing steps taken by the retransmitter component of the video server. It is readily understood that other implementations of the retransmitter component are also within the scope of the present invention.

It is further envisioned that a retransmitting client may be designated a "controlling" client for a secondary client requesting video data from the retransmitting client. In this case, the "controlling" client dictates the viewing parameters of the video data viewed at the secondary client. In other words, the secondary client views the video data in the same manner as it is viewed on the controlling client. This synchronized viewing feature is beneficial for certain video conferencing applications, such as narrated training videos or other such needs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A video transmission system, comprising:
a video source;
a video server adapted to receive video data from the video source, the video server operable to buffer the video data and transmit the video data across a network; and
a video retransmitter residing on a first computing device and adapted to receive the video data via the network from the video server, said video retransmitter operable to buffer the video data and re-transmit the video data to a second computing device, wherein the second computing device is configured to receive the video data from either the video server or the video retransmitter, and operable to select either the video server or the video retransmitter as a source for the video data based on a metric associated with the transmission path of the video data from the source, wherein the video server receives the video data at a first resolution and the retransmitter is operable to re-transmit the video data at a second resolution different from the first resolution.

2. The video transmission system of claim 1 wherein the video source is further defined as a digital camera.

3. The video transmission system of claim 1 wherein the video server is integrated with the video source.

4. The video transmission system of claim 1 wherein the second computing device is operable to display the video data.

5. The video transmission system of claim 1 wherein the second computing device is configurable to receive the video data from the selected source.

6. The video transmission system of claim 1 wherein the second computing device is adapted to receive the video data via the network from the video retransmitter.

7. The video transmission system of claim 1 wherein the second computing device is adapted to receive the video data via another network from the video retransmitter.

8. A video transmission system, comprising:

a video source;

a video server adapted to receive video data from the video source, the video server operable to buffer the video data and transmit the video data across a network; and a video retransmitter residing on a first computing device and adapted to receive the video data via the network from the video server, said video retransmitter operable to buffer the video data and re-transmit the video data to a second computing device, wherein the second computing device is configured to receive the video data from either the video server or the video retransmitter, and operable to select either the video server or the video retransmitter as a source for the video data based on a metric associated with the transmission path of the video data from the source, wherein the video server is operable to maintain a directory, where the directory includes a list of client computing devices to whom video data is currently being sent and which are configured to retransmit the video data.

9. The video transmission system of claim 8 wherein each entry in the directory identifies a source whose video data is capable of being retransmitted from a source other than the video server, a network address for the identified source; and an indicator as to whether the video data is being received on a dedicated basis.

10. The video transmission system of claim 8 wherein the video server is adapted to receive requests for the video data and operable to log an entry into the directory when the requesting computing device is configured to retransmit the video data.

11. The video transmission system of claim 8 wherein said directory is accessible to the second computing device, the second computing device being operable to evaluate each alternative source for the video data being requested; and selecting a source for the video data based on a metric associated with the transmission path of the video data from the source.

12. A method for transmitting video data across a network environment, comprising:

receiving video data at a video server from a digital camera and buffering the video data in a data store residing on the video server;

transmitting the video data from the video server across a network to a first client computing device at a resolution different than a resolution of the video data received at the video server;

buffering the video data in a data store residing on the first client computing device;

determining by a second client computing device to retrieve the video data from either the video server or the first client computing device by accessing a retransmitter directory residing on the video server, where the directory is a list of client computing devices to whom video data is currently being sent and which are configured to retransmit the video data;

evaluating a metric associated with each alternative source for the video data being buffered; and selecting a source for the video data based on said metrics.

13. The method of claim 12 wherein the step of transmitting the video data from the video server further comprises:

receiving a request for the video data from the first client computing device;

determining whether the first client computing device is configured to retransmit the video data; and logging an entry in a retransmitter directory when the first client computing device is configured to retransmit the video data.

14. The method of claim 12 wherein the metric is associated with a transmission path of the video data from the evaluated source.

15. The method of claim 12 wherein the step of buffering the video data further comprises periodically reassessing whether the video data may be retrieved from an alternative data source.

16. The method of claim 12 wherein the step of retransmitting the video data from the first client computing device further comprises transmitting the video data at a resolution different than a resolution of the video data received at the first client computing device.

* * * * *